(12) United States Patent
Itou

(10) Patent No.: US 7,249,662 B2
(45) Date of Patent: Jul. 31, 2007

(54) SHOCK ABSORBING STRUCTURE FOR MOTOR VEHICLE AND SHOCK ABSORBING ASSEMBLY INCLUDING THE SAME

(75) Inventor: Kaoru Itou, Nagoya (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 10/937,082

(22) Filed: Sep. 9, 2004

(65) Prior Publication Data

US 2006/0011434 A1 Jan. 19, 2006

(30) Foreign Application Priority Data

Jul. 14, 2004 (JP) .............. 2004-206798

(51) Int. Cl.
*F16F 7/12* (2006.01)
*B60R 21/04* (2006.01)

(52) U.S. Cl. ............ 188/377; 188/371; 296/187.05

(58) Field of Classification Search ............ 188/371, 188/372, 376, 377; 296/29, 187.03, 187.05, 296/187.09, 187.1, 187.11, 187.12, 187.13; 267/136, 191; 293/120, 122, 132, 133, 134, 293/135, 136
See application file for complete search history.

(56) References Cited

U.S. PATENT DOCUMENTS

| | | | | |
|---|---|---|---|---|
| 3,033,708 A | * | 5/1962 | McKee | 427/375 |
| 4,098,525 A | * | 7/1978 | Schwanz et al. | 188/377 |
| 4,890,877 A | * | 1/1990 | Ashtiani-Zarandi et al. | 188/371 |
| 5,290,079 A | * | 3/1994 | Syamal | 293/120 |
| 5,290,622 A | * | 3/1994 | Tanabe | 428/182 |
| 5,514,448 A | * | 5/1996 | Kishi et al. | 428/166 |
| 5,531,499 A | * | 7/1996 | Vecchio et al. | 188/377 |
| 5,884,962 A | * | 3/1999 | Mattingly et al. | 296/187.05 |
| 5,988,713 A | * | 11/1999 | Okamura et al. | 293/120 |
| 6,036,227 A | * | 3/2000 | Lin et al. | 188/377 |
| 6,204,328 B1 | * | 3/2001 | Sanpei et al. | 525/89 |
| 6,247,745 B1 | * | 6/2001 | Carroll et al. | 188/371 |
| 6,406,079 B2 | * | 6/2002 | Tamada et al. | 293/120 |
| 6,547,280 B1 | * | 4/2003 | Ashmead | 296/187.03 |
| 6,663,169 B2 | * | 12/2003 | Gehringhoff et al. | 296/187.03 |
| 6,705,669 B1 | * | 3/2004 | Pearcy et al. | 296/187.05 |
| 6,715,592 B2 | * | 4/2004 | Suzuki et al. | 188/371 |
| 6,752,450 B2 | * | 6/2004 | Carroll et al. | 296/187.03 |
| 6,908,143 B2 | * | 6/2005 | Ashmead | 296/187.05 |
| 2004/0129518 A1 | * | 7/2004 | Tamada et al. | 188/377 |

FOREIGN PATENT DOCUMENTS

JP 2000-211454 A1 8/2000

* cited by examiner

*Primary Examiner*—Thomas Williams
(74) *Attorney, Agent, or Firm*—Burr & Brown

(57) ABSTRACT

A shock absorbing structure for a motor vehicle including at least one main body which includes a top wall and two leg walls, wherein the distance between the leg walls in a direction in which they are opposed to each other gradually increases with an increase in a distance in a direction which is away from the top wall toward the distal portions, with an obtuse interior angle being formed at each of corners which are formed by the top wall and the respective two leg walls, the top wall and the leg walls are integrally formed of a synthetic resin material whose tensile elongation according to ASTM D638 is not less than 150%, an inner surface of each corner being provided by a concave curved surface having a radius of curvature of not less than 2.0 mm.

14 Claims, 9 Drawing Sheets

SHOCK ABSORBING STRUCTURE FOR MOTOR VEHICLE AND SHOCK ABSORBING ASSEMBLY INCLUDING THE SAME

The present application is based on Japanese Patent Application No. 2004-206798 filed on Jul. 14, 2004, the contents of which are incorporated herein by reference.

BACKGROUND OF THE INVENTION

1. Field of the Invention

The present invention relates in general to a shock absorbing structure for a motor vehicle and a shock absorbing assembly including the same. More particularly, the invention relates to an improved shock absorbing structure disposed in an installation space defined by and between a vehicle component and a vehicle body, and a shock absorbing assembly wherein the shock absorbing structure is advantageously installed or mounted on the vehicle component.

2. Discussion of Related Art

Conventionally, a shock absorbing structure for absorbing impact energy is provided or disposed between various components of a motor vehicle or other motor vehicle and a body of the vehicle. The shock absorbing structure disposed as described above is arranged to be deformed for absorbing a shock or impact generated by contact of a passenger or driver of a vehicle (hereinafter referred to as "vehicle passenger") or a pedestrian with the vehicle component in the event of a collision of the vehicle from an accident, thereby assuring improved safety of the vehicle passenger or the pedestrian.

There are known various types of shock absorbing structure having various shock absorbing characteristics. Among various types of shock absorbing structure, a suitable one is selected so as to satisfy the conditions for installing the shock absorbing structure between the vehicle component and the vehicle body, the shock absorbing characteristics required by the vehicle component, etc.

There is known a shock absorbing structure disposed in a considerably narrow or small installation space having a size of not greater than about 20 mm, such as a space defined by and between a roof reinforcement located over a front pillar and a ceiling interior member of a vehicle, which space is considerably narrower or smaller than the other space defined by and between the vehicle body and the vehicle components other than the ceiling interior member. One example of such a shock absorbing structure includes a planar rectangular top wall portion to which the shock is applied and two planar leg walls formed integrally with the top wall portion such that the two leg walls respectively extend from opposite two side edges of the top wall portion so as to be opposed to each other, toward one of opposite sides of the top wall portion as seen in a direction of thickness thereof. The known shock absorbing structure is formed of a thin steel plate and has a generally U-shape in cross section.

The above-described shock absorbing structure formed of the steel plate and having the U-shaped cross sectional shape is generally disposed in a space between the roof reinforcement and the ceiling interior member of the vehicle, such that the two leg walls extend in a direction in which the roof reinforcement and the ceiling interior member are opposed to each other. In other words, the shock absorbing structure described above is disposed in the space such that the two leg walls extend in a direction in which the shock is applied from an external to the ceiling interior member. With the shock absorbing structure being thus disposed in the space, when the shock is applied to the shock absorbing structure by contact of the vehicle passenger with the ceiling interior member in the event of a collision from an accident, for instance, the distal portions of the two leg walls slide on the ceiling interior member or the roof reinforcement so as to be displaced away from each other. Thus, the two leg walls are deformed so as to be displaced away from each other such that a rate of increase in a distance between the two leg walls in a direction in which the two leg walls are opposed to each other gradually increases with an increase in a distance in a direction which is perpendicular to that direction and which is away from the top wall portion toward the distal portions of the leg walls, for thereby absorbing the impact energy. (The deformation described above is referred to as "opening deformation".)

In the meantime, in a shock absorbing structure having cylindrical members made of resin, a shock absorbing structure in which a plurality of resin-made ribs are arranged in lattice on a base plate, or a shock absorbing structure formed of resin foamed body, for instance, an entirety or a portion of each shock absorbing structure is subjected to buckling deformation or collapsing deformation for absorbing the impact energy. In contrast, in the above-described shock absorbing structure formed of the steel plate and having the U-shape in cross section, it is less likely that deformed portions are superposed on each other, so that the height of the structure after deformation can be made sufficiently small. Accordingly, even if the height of the shock absorbing structure before deformation is made small so as to correspond to a size of a small or narrow installation space in which the structure is to be disposed, an effective stroke index of the structure, i.e., a ratio of an amount of deformation of the shock absorbing structure by application of the shock thereto to the height of the shock absorbing structure before deformation, can be made sufficiently large, so that the shock absorbing structure exhibits excellent shock absorbing capability with high reliability.

However, the above-described shock absorbing structure formed of the steel plate and having the U-shape in cross section is generally attached to the vehicle body at local points thereof by spot welding, screw-fastening, etc. Accordingly, the shock absorbing structure when disposed in the space between the vehicle component and the vehicle body inevitably suffers from a variation in its shock absorbing characteristics at different portions thereof depending upon whether the portions are fixed to the vehicle body or not.

In the meantime, there is conventionally known a shock absorbing structure, as disclosed in JP-A-2000-211454, which includes resin main bodies each having a generally U-shape in cross section and including a top wall and two leg walls which are formed integrally with each other by using a synthetic resin material. In such a shock absorbing structure formed of resin, an entirety of one of opposite major surfaces of the top wall is bonded to the vehicle component or the vehicle body, for instance. Alternatively, where the vehicle component is made of a synthetic resin material, the entirety of one of opposite major surfaces of the top wall and a portion of the vehicle component corresponding to the top wall are welded together, so that the resin shock absorbing structure is attached to the vehicle component or the vehicle body at local areas thereof by a so-called welding operation. Accordingly, the shock absorbing structure bonded to the vehicle component or the vehicle body at local areas thereof does not suffer from the above-described problem of variation of the shock absorbing characteristics experienced in a case where the conventional shock absorbing structure formed of the steel plate and having the U-shape in cross section is fixed to the vehicle body at local points thereof.

The shock absorbing structure which includes the resin main bodies having the U-shape in cross section and which is disclosed in the above-described Publication, however, is adapted to absorb the impact energy such that the leg walls are subjected to buckling deformation upon application of the shock to the structure from the external. Accordingly, the disclosed shock absorbing structure does not have the effective stroke index as large as that in the above-described shock absorbing structure formed of the steel plate and having the U-shape in cross section. The shock absorbing structure disclosed in the Publication exhibits a sufficiently high degree of shock absorbing capability if it is disposed in an installation space having a certain degree of size. The disclosed shock absorbing structure, however, inevitably suffers from insufficient shock absorbing capability if it is disposed, in its known structure without any modification, in a considerably small or narrow installation space between the vehicle component and the vehicle body, in place of the above-described shock absorbing structure formed of the steel plate and having the U-shape in cross section.

It might be considered possible, for instance, that the configuration of the resin main body is modified such that the two leg walls are not subjected to the buckling deformation, but subjected to the above-described opening deformation upon application of the shock to the resin main body, in other words, the two leg walls are deformed such that a rate of increase in a distance between the two leg walls as measured in a direction in which they are opposed to each other gradually increases with an increase in a distance as measured in a direction which is perpendicular to that direction and which is away from the top wall toward distal portions of the leg walls, for the purpose of improving the shock absorbing capability exhibited when the resin shock absorbing structure having the resin main bodies is disposed in the considerably narrow or small space.

Even if the leg walls are arranged to be subjected to the opening deformation described above by optimizing the configuration of the resin main body, the resin shock absorbing structure may undergo stress concentration at corners formed by the top wall and the leg walls when the leg walls are subjected to the opening deformation, so that there may be generated cracking or fracture at the corners, causing a risk that the shock absorbing structure is not capable of absorbing a desired amount of impact energy.

SUMMARY OF THE INVENTION

The present invention was developed in the light of the situations described above. It is therefore a first object of the invention to provide a shock absorbing structure for a vehicle which is capable of absorbing a desired amount of impact energy with high reliability and high stability in a state in which the shock absorbing structure is disposed within a considerably small or narrow space defined by and between a vehicle component and a vehicle body, thereby exhibiting excellent shock absorbing capability with high stability.

It is a second object of the invention to provide an assembly including the shock absorbing structure having excellent characteristics described above, in which the shock absorbing structure is advantageously disposed or installed between the vehicle component and the vehicle body.

The above-indicated first object may be achieved according to a first aspect of the invention, which provides a shock absorbing structure for a vehicle comprising at least one resin main body which includes a planar top wall to which a shock is to be applied and two planar leg walls which are formed integrally with the top wall such that the two leg walls respectively extend from opposite two end portions of the top wall so as to be opposed to each other, toward one of opposite sides of the top wall, which side is opposite to the other side thereof on which the shock is applied, the at least one resin main body being formed of a synthetic resin material and having a generally U-shape in cross section, wherein the two leg walls are provided on the top wall so as to be inclined such that a distance between the two leg walls in a first direction in which the two leg walls are opposed to each other gradually increases with an increase in a distance in a second direction which is perpendicular to the first direction and which is away from the top wall toward distal portions of the two leg walls, with an obtuse interior angle being formed at each of corners which are formed by said top wall and the respective two leg walls, the top wall and the two leg walls being formed integrally with each other by using a synthetic resin material whose tensile elongation according to ASTM D638 is not less than 150%, an inner surface of said each of the corners being provided by a concave curved surface having a radius of curvature of not less than 2.0 mm.

In the shock absorbing structure constructed as described above, the two leg walls of the at least one resin main body having the U-shaped cross sectional shape are formed integrally with the top wall so as to extend from its opposite two end portions that are located on one of the opposite sides of the top wall, which side is opposite to the other of the opposite sides on which the shock is to be applied. The two leg walls are inclined such that the distance therebetween in the first direction in which the two leg walls are opposed to each other gradually increases with an increase in the distance in the second direction which is perpendicular to the first direction and which is away from the top wall toward the distal portions of the two leg walls. With the thus constructed shock absorbing structure being disposed in an installation space defined by and between a vehicle component and a vehicle body, the distal portions of the leg walls slide, upon application of the shock or impact to the top wall, on the vehicle component or the vehicle body that is located remote from the top wall, so as to be displaced away from each other. Accordingly, the two leg walls are deformed so as to be displaced away from each other such that a rate of increase in the distance between the two leg walls as measured in the first direction in which the two leg walls are opposed to each other gradually increases with an increase in the distance as measured in the second direction which is perpendicular to the first direction and which is away from the top wall toward the distal portions of the leg walls, without being substantially subjected to the buckling deformation, while the corners formed by the top wall and the respective two leg walls are deformed such that the interior angles thereof gradually increase. (Hereinafter, the above-described deformation of the two leg walls is referred to as "opening deformation"). Thus, the shock absorbing structure absorbs the impact energy applied to the top wall based on the above-described opening deformation of the leg walls.

In the present shock absorbing structure wherein, upon application of the shock to the top wall, the two leg walls are subjected to the above-described opening deformation without being substantially subjected to the buckling deformation, the configuration or profile of the resin main body having the U-shaped cross sectional shape in a state in which the resin main body is deformed to a maximum degree is a substantially planar or flat shape having a generally "I"-shaped cross sectional shape in which the top wall and the two leg walls are arranged in a straight line and in which there is no or substantially no superposition of deformed portions. Therefore, the effective stroke index in present shock absorbing structure represented by a ratio of the amount of deformation of the structure by application of the shock thereto, to the height of the structure before deformation is significantly increased as compared with that in the conventional shock absorbing structure having the resin main body which is subjected to the buckling deformation or collapsing deformation upon application of the shock.

In the present shock absorbing structure constructed as described above, the top wall and the two leg walls are formed integrally with each other by using the synthetic resin material whose tensile elongation measured according to ASTM D638 is not less than 150% and the inner surface of each of the corners formed by the top wall and the respective two leg walls is provided by a relatively smooth concave curved surface having a radius of curvature of not less than 2.0 mm. According to this arrangement, when the two leg walls are subjected to the opening deformation described above upon application of the shock to the top wall, the corners formed by the top wall and the respective two leg walls are deformed such that the interior angles of the corners gradually increase while the inner portion of each of the corners as seen in the direction of thickness thereof is elongated. This arrangement is effective to eliminate or alleviate stress concentration at the corners formed by the top wall and the two leg walls upon the opening deformation of the leg walls, thereby effectively avoiding occurrence of cracking or fracture at the corners which arise from the stress concentration.

Where the present shock absorbing structure whose resin main body has the planar top wall is installed on the vehicle component or the vehicle body, one of opposite major surfaces of the top wall is bonded at its entirety to the vehicle component or the vehicle body, or welded at its entirety to the vehicle component made of synthetic resin. Accordingly, unlike the conventional arrangement in which the shock absorbing structure is bonded at its local points to the vehicle component or body, the present shock absorbing structure bonded to the vehicle component or body as described above does not suffer from the conventionally experienced problem of variation in the shock absorbing characteristics at different portions thereof depending upon whether or not the portions are fixed to the vehicle component or body.

The present shock absorbing structure having the advantages described above is capable of absorbing a desired amount of impact energy with high reliability and high stability even where the structure is disposed in a considerably small space defined by and between the vehicle component and the vehicle body, thereby exhibiting excellent shock absorbing capability with high stability.

In a first preferred form of the above-described first aspect of the invention, the at least one resin main body consists of a plurality of resin main bodies which are arranged such that adjacent ones of the plurality of resin main bodies are spaced apart from each other by a predetermined spacing distance therebetween with one of the two leg walls of one of the adjacent two resin main bodies and one of the two leg walls of the other of the adjacent two resin main bodies being mutually opposed to each other, the shock absorbing structure further comprising at least one planar connecting body which is formed of a synthetic resin material and which is disposed between the adjacent two resin main bodies such that a direction of thickness of the at least one connecting body corresponds to a direction of height of the two leg walls, so that said one of the two leg walls of said one of the adjacent two resin main bodies and said one of the two leg walls of the other of the adjacent two resin main bodies are connected to each other at the respective distal portions thereof remote from the respective top walls of the adjacent two resin main bodies.

The shock absorbing structure constructed according to the above-described first preferred form permits a maximum number of the resin main bodies to be disposed with ease and little effort in the space between the vehicle component and the vehicle body depending upon the size of the space, so that the shock absorbing structure exhibits excellent shock absorbing capability with ease.

In a second preferred form of the above-described first aspect of the invention, the at least one connecting body is formed integrally with the resin main bodies by using the synthetic resin material used for forming the resin main bodies, an inner surface of each of corners which are formed by the at least one connecting body and the mutually opposed leg walls of the adjacent two resin main bodies being provided by a concave curved surface having a radius of curvature of not less than 2.0 mm.

In the shock absorbing structure constructed according to the above-described second preferred form, like the corners formed by the two leg walls and the top wall, the corners formed by the mutually opposed two leg walls of the adjacent two resin main bodies and the at least one connecting body are deformed, upon the opening deformation of the leg walls by application of the shock, such that the interior angles of the corners gradually increase while the inner portions of those corners as seen in the direction of thickness thereof are elongated. Accordingly, the present arrangement is effective to prevent the corners formed by the mutually opposed leg walls of the two adjacent resin main bodies and the at least one connecting body from suffering from cracking or fracture which arises from the stress concentration upon the opening deformation of the leg walls.

The shock absorbing structure constructed according to the second preferred form and having the advantages described above is capable of reliably and stably absorbing the desired amount of impact energy in a state in which the structure is disposed in the considerably small or narrow space between the vehicle component and the vehicle body, assuring excellent shock absorbing capability.

In a third preferred form of the above-described first aspect of the invention, the top wall of the at least one resin main body is an elongate plate having a prescribed length, and the two leg walls provided on the top wall respectively extend in a longitudinal direction of the top wall and are opposed to each other in a direction perpendicular to the longitudinal direction.

The shock absorbing structure constructed according to the above-described third preferred form can be disposed such that the resin main body extends, with a suitable length, in a longitudinal direction or running direction of the vehicle within a considerably small installation space between the vehicle component and the vehicle body such as between a roof reinforcement over a front pillar and a ceiling interior member of the vehicle, while considering a possibility that a body portion of the vehicle passenger is brought into contact with the vehicle component at a plurality of local portions thereof in the longitudinal direction of the vehicle or the body portion of the passenger is brought into contact with the vehicle component such that the contact portion changes or moves in the longitudinal direction of the vehicle rather than in the widthwise direction thereof.

The shock absorbing structure constructed according to the above-described third preferred form and having the advantages described above is capable of absorbing the impact energy generated by contact of the vehicle passenger with the vehicle component with high efficiency and high reliability, so as to assure a high degree of shock absorbing capability.

In a fourth preferred form of the above-described first aspect of the invention, each of the two leg walls is formed with at least one fragile portion at which said each of the two leg walls has a strength lower than the other portion thereof, the at least one fragile portion extending in a direction which intersects a direction of extension of the two leg walls from the top wall, the two leg walls being bent at the at least one fragile portion when the shock is applied to the top wall.

In the shock absorbing structure constructed according to the above-described fourth preferred form, when the two leg walls of the resin main body is subjected to the opening deformation by application of the shock, the two leg walls are bent at each of the at least one fragile portion, thereby exhibiting shock absorbing characteristics different from those exhibited by the structure whose leg walls are not provided with the fragile portion. Accordingly, the shock absorbing characteristics of the structure can be easily tuned by forming the fragile portion on each leg wall.

The above-indicated second object of the invention may be achieved according to a second aspect of the invention, which provides a shock absorbing assembly for a vehicle, comprising the shock absorbing structure according to the above-described first aspect of the invention, a component of the vehicle, and a body of the vehicle, wherein the shock absorbing structure is installed on the component so as to be disposed in a space between the component and the body of the vehicle, such that one surface of the top wall of any one of the at least one resin main body, which surface is located on the other of the opposite sides thereof on which the shock is applied, is fixed to one surface of the component which is located on one of opposite sides thereof nearer to the body of the vehicle, with the distal portions of the respective two leg walls remote from the top wall not being fixed to the body of the vehicle.

In the assembly described above, the at least one resin main body is fixed at the top wall to the surface of the vehicle component which is opposed to the vehicle body, so that the shock absorbing structure in a state in which it is disposed between the vehicle component and the vehicle body does not suffer from the problem of variation in its shock absorbing capability. Since the distal portions of the leg walls are free ends without being fixed to the vehicle body, the leg walls are easily and smoothly subjected to the above-described opening deformation when the shock is applied to the top wall. Where the shock absorbing structure includes a plurality of resin main bodies, the shock absorbing structure is bonded to the vehicle component at the top wall of only one of the plurality of resin main bodies, so that the leg walls of the plurality of resin main bodies can be smoothly subjected to the opening deformation.

In the assembly having the advantages described above, the shock absorbing structure can be advantageously disposed or installed in a space between the vehicle component and the vehicle body in a state in which the structure can stably and efficiently absorb the desired amount of impact energy even if the space is considerably small or narrow.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

By referring to the accompanying drawings, there will be described in detail some examples of a shock absorbing structure for a motor vehicle and an assembly including the shock absorbing structure, to which the present invention is applied, for further clarifying the present invention.

Figure 1:
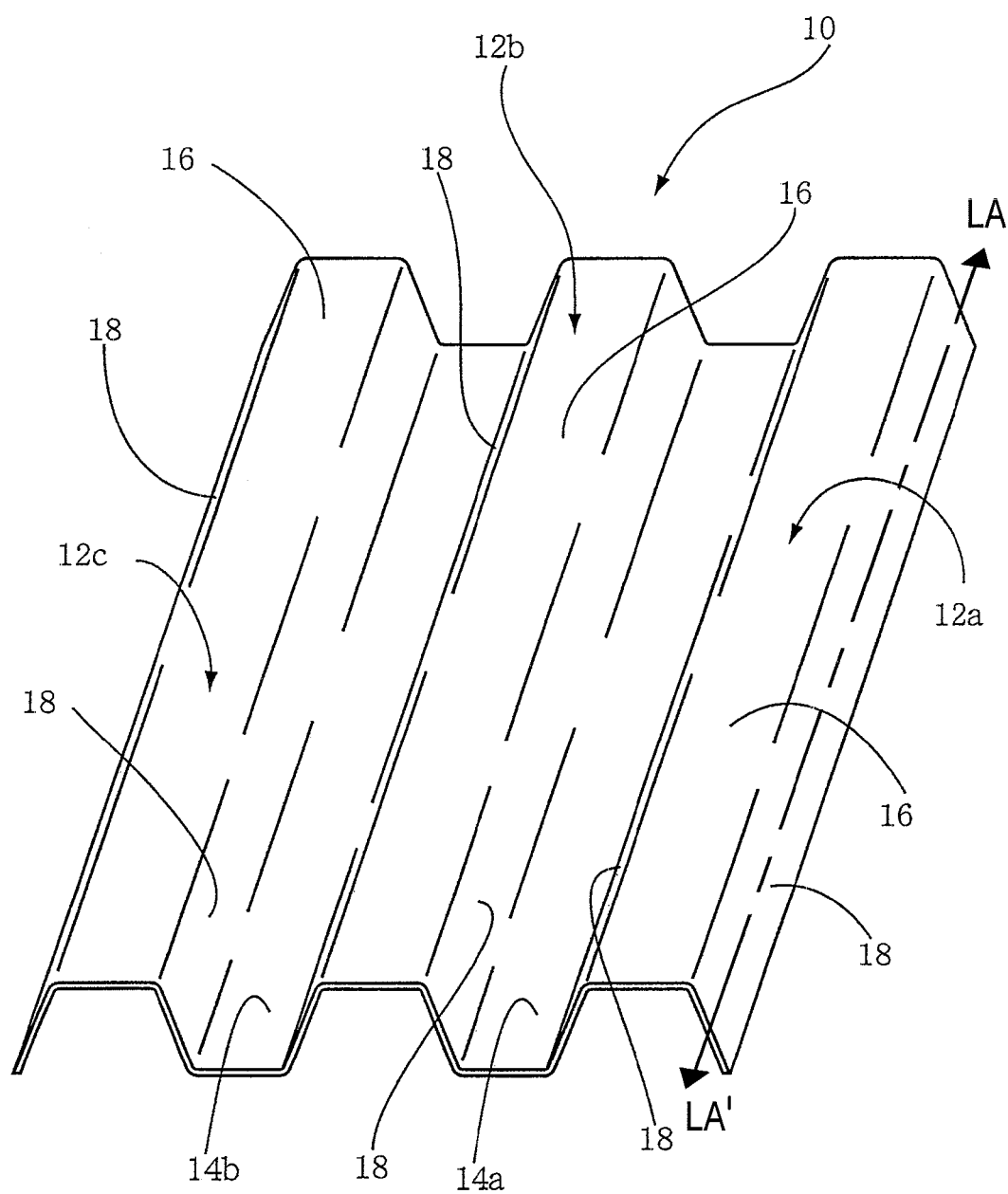
FIG. 1 is a perspective view of a shock absorbing structure for a motor vehicle constructed according to one embodiment of the present invention.
Figure 2:
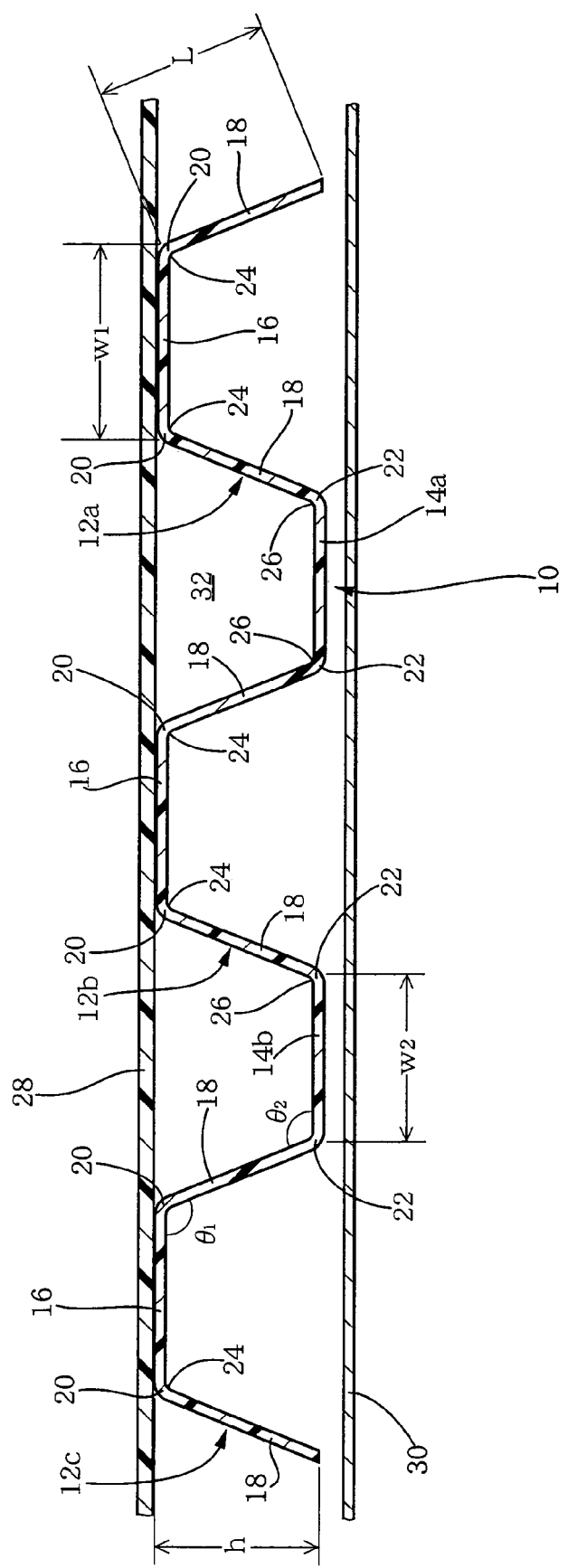
FIG. 2 is a transverse cross sectional view of the shock absorbing structure of FIG. 1 as disposed in an installation space between a ceiling interior member and a roof reinforcement of the vehicle.

Referring first to the perspective view of FIG. 1 and the transverse cross sectional view of FIG. 2, there is schematically shown a shock absorbing structure 10 for a motor vehicle, constructed according to one embodiment of the present invention. The shock absorbing structure 10 is disposed in an installation space 32 defined by and between a component of the vehicle in the form of a ceiling interior member 28 and a body of the vehicle in the form of a roof reinforcement 30. As shown in FIGS. 1 and 2, the present shock absorbing structure 10 includes three resin main bodies 12a, 12b, 12c which are connected integrally with one another by two connecting bodies 14a, 14b. (Where it is not necessary to distinguish the three resin main bodies 12a, 12b, 12c from one another, the resin main body is referred to simply as "resin main body 12". Similarly, where it is not necessary to distinguish the two connecting bodies 14a, 14b from each other, the connecting body 14 is referred to simply as "connecting body 14").

More specifically described, each of the three resin main bodies 12a, 12b, 12c of the present shock absorbing structure 10 includes a thin planar top wall 16 having an elongate rectangular shape and two thin planar leg walls 18, 18 each having an elongate rectangular shape and a thickness and a length equal to those of the top wall 16. Thus, the three resin main bodies 12a, 12b, 12c are identical in size and configuration with one another. The two leg walls 18, 18 are provided integrally on the top wall 16 such that the two legs 18 respectively extend from opposite two side edges (end portions) of the top wall 16 which extend in a longitudinal direction of the top wall 16. The two leg walls 18, 18 extend toward one of opposite sides of the top wall 16 as seen in a direction of its thickness, so as to be opposed to each other. Each of the two leg walls 18, 18 has a longitudinal axis LA–LA', which extends parallel to the longitudinal axis of the other of the two leg walls 18, 18. The thus constructed three resin main bodies 12a, 12b, 12c are located such that the three resin main bodies 12a, 12b, 12c are spaced apart from each other by a prescribed spacing distance in a direction of width thereof with one of the two leg walls 18, 18 of one of adjacent two of resin main bodies 12a, 12b, 12c (i.e., 12a and 12b or 12b and 12c) and one of the two leg walls 18, 18 of the other of the adjacent two of resin main bodies 12a, 12b, 12c being mutually opposed to each other.

Each of the two connecting bodies 14a, 14b is a thin planar plate having an elongate rectangular shape, and has the same thickness and length as those of the top wall 16 and each leg wall 18 of the resin main body 12. Each connecting body 14 is located between the mutually opposed two leg walls 18 of the adjacent two of resin main bodies 12a, 12b, 12c such that the direction of height of each leg wall 18 corresponds to the direction of thickness of the connecting body 14, in other words, such that the connecting body 14 extends in parallel with the top wall 16 of each resin main body 12, so that the mutually opposed two leg walls 18 of the adjacent two of resin main bodies 12a, 12b, 12c are connected integrally to each other by the connecting body 14, at respective distal portions thereof.

Thus, the resin main body 12 is constituted by an integral body consisting of the top wall 16 and the two leg walls 18, 18 and has a generally U-shape in transverse cross section. In the present embodiment, the three resin main bodies 12a, 12b, 12c are connected to one another by the two planar connecting bodies 14a, 14b to provide the shock absorbing structure 10. In this arrangement, it may be considered that the shock absorbing structure 10 is formed from a single rectangular resin plate which is bent at plurality of portions in its width direction, to thereby provide top portions given by the top walls 16, bottom portions given by the connecting bodies 14, and connect portions given by the leg walls 18, each connect portions connecting the corresponding top and bottom portions. Thus, the shock absorbing structure 10 has convex portions and concave portions which are alternate with each other. The shock is applied from the external to the top walls 16 which give the top portions of the convex portions, so that the leg walls 18 are primarily deformed to absorb the shock or impact energy.

In the present embodiment, the entirety of the shock absorbing structure 10 is, in other words, the three resin main bodies 12a, 12b, 12c and the two connecting bodies 14a, 14b are formed of a synthetic resin material having a tensile elongation value as high as not less than 150%, which tensile elongation value is measured according to the Standard Test Method for Tensile Properties of Plastics specified in ASTM D638. The shock absorbing structure 10 is formed of the above-described synthetic resin material by injection molding, for instance.

The shock absorbing structure 10 formed of the above-described synthetic resin material as a whole exhibits a high degree of tensile strength and a large amount of tensile elongation. For instance, when corners 20 formed by the top wall 16 and the respective two leg walls 18, 18 of each resin main body 12 (hereinafter referred to as "top-wall-side corners 20") and corners 22 formed by each connecting body 14 and the mutually opposed two leg walls 18 of the adjacent two resin main bodies 12a, 12b 12c (hereinafter referred to as "connecting-body-side corners 22") are deformed, upon application of the shock to the top wall 16, such that the interior angles ($\theta_1$, $\theta_2$) of the corners 20, 22 are increased with tensile force being applied to an inner portion of each corner as seen in the direction of thickness thereof, the inner portions of the corners 20, 22 are elongated by a sufficiently large amount. Examples of the synthetic resin material having the characteristics and used for forming the shock absorbing structure 10 include olefin resin such as polypropylene and polyethylene, a mixture of the olefin resin and organic filler, glass fiber, etc., and ABS resin.

In the present shock absorbing structure 10, the interior angle $\theta_1$ of each top-wall-side corner 20 and the interior angle $\theta_2$ of each connecting-body-side corner 22 are obtuse angles of more than 90°. In other words, the two leg walls 18, 18 of each resin main body 12 extend integrally from widthwise opposite side edges of the top wall 16 such that the two leg walls 18 are inclined at an angle corresponding to the interior angle $\theta_1$ of the top-wall-side corners 20, so that a distance between the two leg walls 18 as measured in a first direction in which the two leg walls 18 are opposed to each other gradually increases with an increase in a distance in a second direction which is perpendicular to the first direction and which is away from the top wall 16 toward the distal portions of the two leg walls 18. Further, the mutually opposed two leg walls 18 of the adjacent two resin main bodies 12a, 12b, 12c integrally extend from widthwise opposite side edges of each connecting body 14 such that the mutually opposed two leg walls 18 are inclined at an angle corresponding to the interior angle $\theta_2$ of the connecting-body-side corners 22, so that a distance between the mutually opposed leg walls 18 of the adjacent two resin main bodies 12a, 12b, 12c as measured in the first direction in which the mutually opposed leg walls 18 are opposed to each other gradually increases with an increase in a distance as measured in a third direction which is perpendicular to the first direction and which is away from the distal portions of the leg walls 18 toward the top wall 16.

In the present shock absorbing structure 10, the size of the respective interior angles $\theta_1$, $\theta_2$ of the top-wall-side corners 20 and the connecting-body-side corners 22 are, in other words, the angle of inclination of each leg wall 18 is made sufficiently larger than an angle of inclination of each leg wall or side or lateral wall of a known shock absorbing structure having leg walls or side or lateral walls which extend from a top wall so as to be inclined.

Described more specifically, a shock absorbing structure disclosed in JP-A-2002-166804, for instance, includes resin main bodies and connecting bodies which connect adjacent ones of the resin main bodies. Each resin main body includes a top wall and four lateral or side walls which are formed integrally with each other, and has a hollow truncated pyramidal shape as a whole. The disclosed shock absorbing structure is adapted to absorb the energy of shock applied to the top wall from the external, owing to buckling deformation of the four lateral walls of each resin main body. In the disclosed shock absorbing structure, an interior angle of each of corners which are formed by the top wall and the lateral walls of each resin main body and an interior angle of each of corners which are formed by mutually opposed lateral walls of adjacent ones of the resin main bodies and each connecting body are obtuse, simply for the purpose of preventing, when each lateral wall is subjected to buckling deformation, buckled or deformed portions of each lateral wall being superposed on each other in its height direction In the present shock absorbing structure 10, in contrast, the interior angles $\theta_1$ of the top-wall-side corners 20 and the interior angles $\theta_2$ of the connecting-body-side corners 22 are made sufficiently larger than the interior angle of the corners which are formed by the top wall and the lateral walls and the interior angle of the corners which are formed by the connecting body and the lateral walls in the conventional shock absorbing structure constructed as described above, for the purpose of preventing, upon application of the shock to the structure 10 from the external, the two leg walls 18, 18 formed integrally with the opposite two side edges of the top wall 16 of each resin main body 12 from being subjected to the buckling deformation.

Figure 4:
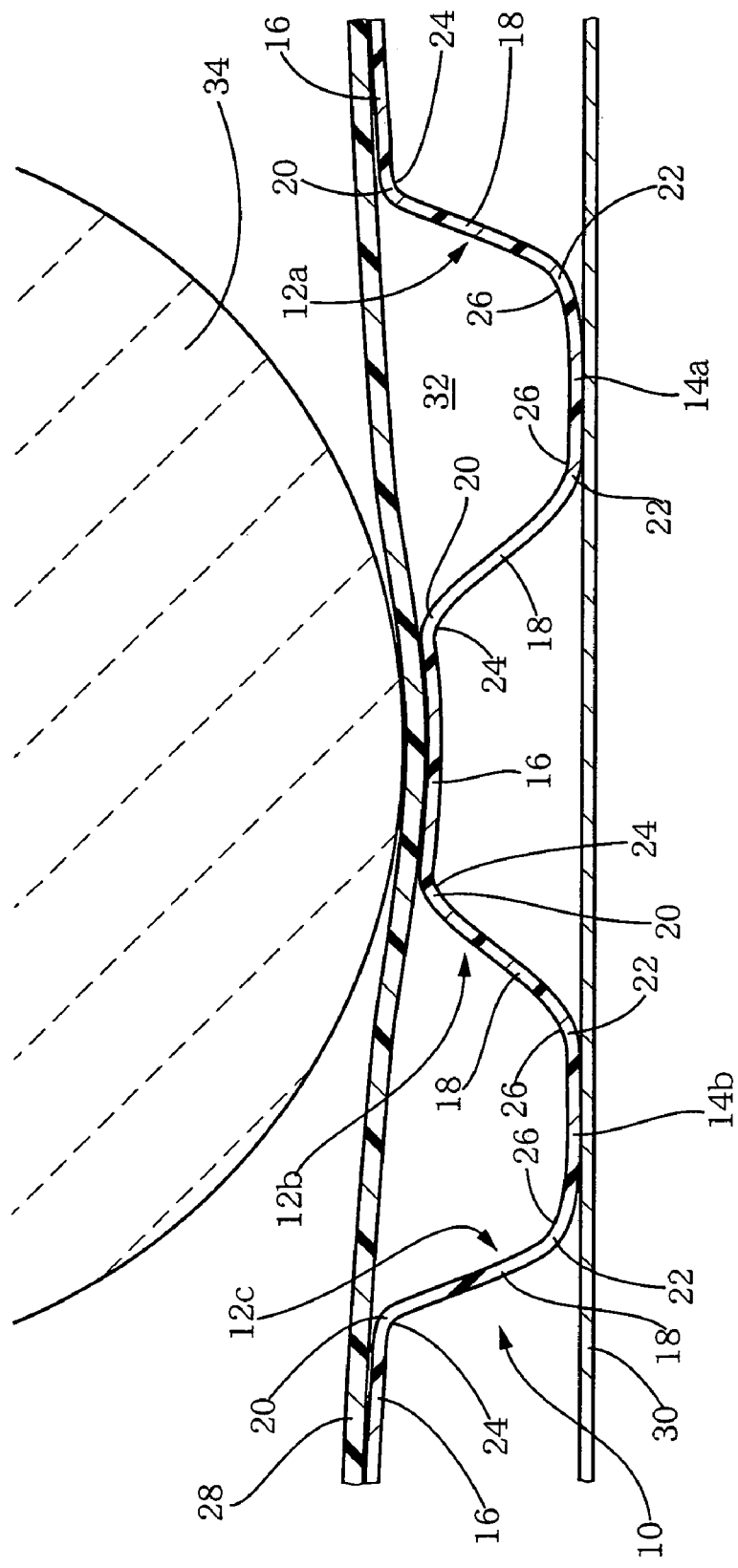
FIG. 4 is a view for explaining the shock absorbing structure of FIG. 1 at an initial stage of deformation caused upon application of shock thereto from an external, in a state in which the shock absorbing structure is disposed in the installation space between the ceiling interior member and the roof reinforcement.
Figure 5:
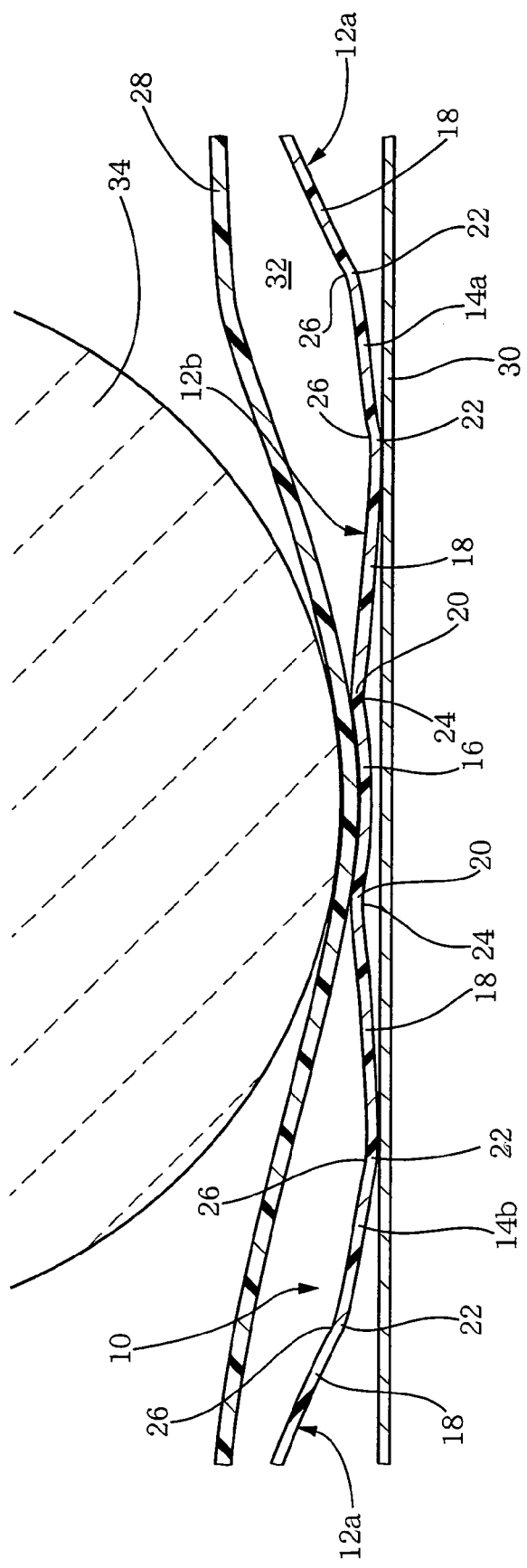
FIG. 5 is a view for explaining a deformed state of the shock absorbing structure followed by the state of FIG. 4.

In the thus constructed shock absorbing structure 10, upon application of the shock to the top wall 16 form the external, the two leg walls 18 are deformed to be displaced away from each other such that a rate of an increase in a distance between the two leg walls 18 as measured in the first direction in which they are opposed to each other gradually increases with an increase in a distance as measured in the second direction which is perpendicular to the first direction and which is away from the top wall 16 toward the distal portions of the two leg walls 18, 18 while the top-wall-side corners 20 and the connecting-body-side corners 22 are deformed such that the interior angles $\theta_1$, $\theta_2$ thereof are increased, as shown in FIGS. 4 and 5. Accordingly, based upon the deformation of the leg walls 18 as described above, the energy of shock applied to the top wall 16 is absorbed. (Hereinafter, the above-described deformation of the two leg walls 18 is referred to as "opening deformation".)

As shown in FIG. 2, in the present shock absorbing structure 10, the height "h" of each resin main body 12 is considerably small, i.e., less than 20 mm, for instance, and accordingly, the length "L" of extension of each leg wall 18 from the top wall 16 is considerably smaller than that of the lateral wall of the conventional shock absorbing structure adapted to absorb the shock by the buckling deformation of the lateral wall. This arrangement permits the shock absorbing structure 10 to be disposed in a considerably small installation space between the ceiling interior member and the roof reinforcement of the vehicle, the installation space having a size as small as about 20 mm. In addition, this arrangement is effective to adequately increase a force required for deforming the top-wall-side corners 20 and the connecting-body-side corners 22 such that the interior angles thereof are increased, in other words, a force required for deforming the leg walls 18 as described above (the opening deformation), thereby advantageously increasing an amount of impact energy to be absorbed by the shock absorbing structure 10 based on the above-described opening deformation of the leg walls 18.

Particular angle of each of the obtuse interior angles $\theta_1$, $\theta_2$ of the top-wall-side corners 20 and the connecting-body-side corners 22 of the present shock absorbing structure 10 is not limited, provided that the leg walls 18 are subjected to the opening deformation described above upon application of the shock to the top wall 16. However, it is preferable that each of the obtuse interior angles $\theta_1$, $\theta_2$ of the top-wall-side corners 20 and the connecting-body-side corners 22 is not less than about 95°.

The length L of extension of the leg wall 18 from the top wall 16 is suitably determined depending upon the height of the resin main body 12 as a whole which is determined depending upon the size of the installation space in which the shock absorbing structure 10 is to be disposed, and the size of the interior angles $\theta_1$, $\theta_2$ of the top-wall-side corners 20 and the connecting-body-side corners 22, while taking into account the amount of impact energy to be absorbed by the shock absorbing structure 10 based upon the above-described opening deformation of the leg walls 18.

The width $w_1$ of the top wall 16 and the width $w_2$ of the connecting body 14 are not particularly limited, and may be suitably determined depending upon the size of a portion of the vehicle passenger which is brought into contact with the vehicle component in the event of a collision, for instance. For example, where the shock absorbing structure 10 is disposed between the ceiling interior member and the roof reinforcement of the vehicle so as to absorb the impact energy generated by contact of a head of the vehicle passenger with the ceiling interior member, the width $w_1$ of the top wall 16 and the width $w_2$ of the connecting body 14 are generally held in a range of about 10 mm to about 50 mm. The respective thickness values of the top wall 16, the leg wall 18, and the connecting body 14 are suitably determined so as to permit the leg walls 18 to be subjected not to the buckling deformation, but to the above-described opening deformation with high stability.

Figure 3:
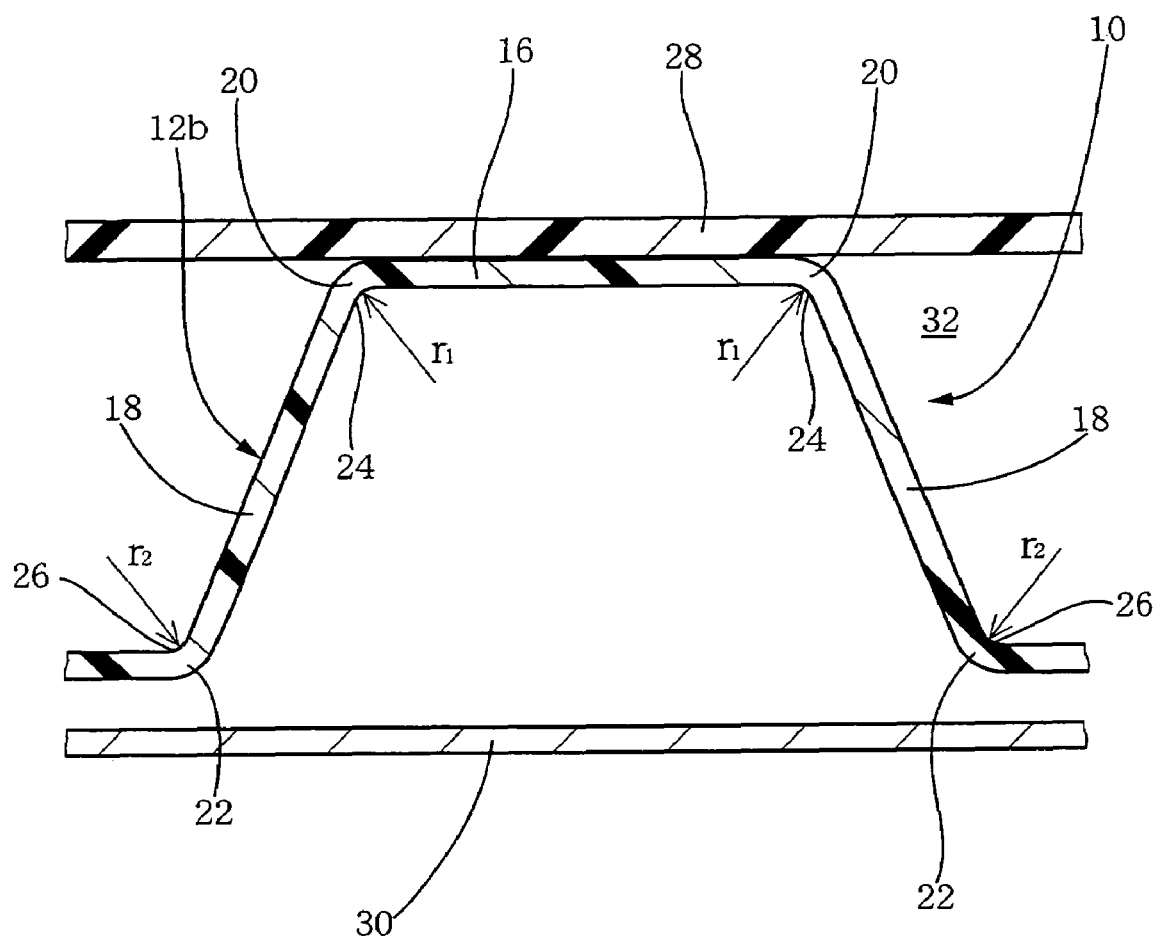
FIG. 3 is a fragmentary enlarged view of the shock absorbing structure in FIG. 2.

In the present shock absorbing structure 10 constructed as described above, the inner surfaces of each top-wall-side corner 20 and the inner surface of each connecting-body-side corner 22 are respective arcuate, concave curved surfaces 24, 26 having respective radii of curvature $r_1$, $r_2$ which are not less than 2 mm, as shown in FIG. 3. Owing to the arrangement in which the respective inner surfaces of the top-wall-side corners 20 and the connecting-body-side corners 22 have the radii of curvature $r_1$, $r_2$ of not less than 2 mm and in which the entirety of the shock absorbing structure 10 is formed of the resin material which exhibits sufficiently large tensile elongation, the amount of opening deformation of the leg walls 18 is prevented from becoming insufficient due to the cracking or fracture generated at each of the corners 20, 22 when the leg walls 18 are subjected to the opening deformation upon application of the shock to the top wall 16, unlike a case in which the inner surfaces of each top-wall-side corner 20 and each connecting-body-side corner 22 are given by angular surfaces in which two planes intersect with each other.

Since the interior surfaces of each top-wall-side corner 20 and each connecting-body-side corner 22 are provided by the concave curved surfaces 24, 26 having the respective radii of curvature $r_1$, $r_2$ of not less than 2 mm and the entirety of the shock absorbing structure 10 is formed of the resin material which exhibits sufficiently large tensile elongation, the inner portions of each top-wall-side corner 20 and each connecting-body-side corner 22 as seen in the thickness direction of the corners 20, 22 are smoothly and gradually elongated with an increase in the size of the interior angles $\theta_1$, $\theta_2$ of the corners 20, 22 when the two leg walls 18, 18 formed integrally with the top wall 16 are subjected to the opening deformation upon application of the shock to the top wall 16 while the corners 20, 22 are deformed such that the interior angles $\theta_1$, $\theta_2$ thereof are increased. Therefore, this arrangement is effective to avoid stress concentration at the top-wall-side corners 20 and the connecting-body-side corners 22, so as to prevent the corners 20, 22 from suffering from the cracking or fracture due to the stress concentration. Accordingly, the leg walls 18 are stably subjected to the opening deformation with a sufficiently large amount of deformation.

Where the radius of curvature $r_1$ of the concave curved surface 24 of each top-wall-side corner 20 and the radius of curvature $r_2$ of the concave curved surface 26 of each connecting-body-side corner 22 are less than 2.0 mm, especially where the radius of curvature $r_1$ of the concave curved surface 24 is less than 2.0 mm, or where the tensile elongation (ASTM D638) of the synthetic resin material which constitutes the shock absorbing structure 10 is less than 150%, the top-wall-side corners 20 undesirably suffer from the cracking or fracture during the opening deformation of the leg walls 18 by application of the shock to the top wall 16. In this case, it is impossible to obtain a sufficiently large amount of deformation of the leg walls 18, failing to absorb the desired amount of impact energy.

In the present embodiment, the shock absorbing structure 10 constructed as described above is used such that it is disposed between the ceiling interior member 28 and the roof reinforcement 30 described below.

As shown in FIG. 2, the present shock absorbing structure 10 is disposed or installed in the installation space 32 defined by and between the ceiling interior member 28 and the roof reinforcement 30 such that the respective top walls 16 of the three resin main bodies 12a, 12b, 12c extend in the longitudinal or running direction of the vehicle (i.e., in a direction perpendicular to the plane of FIG. 2) with one of opposite major surfaces of each top wall 16 which is remote from the leg walls 18 being held in contact with one of the opposite surfaces of the ceiling interior member 28 which is remote from a vehicle compartment, and such that each of the two connecting bodies 14a, 14b is opposed at its one of opposite major surfaces which is remote from the leg walls 18 to one of the opposite surfaces of the roof reinforcement 30 which is opposed to the ceiling interior member 28, with a suitable spacing distance therebetween. In the present embodiment, among the three top walls 16 of the respective three resin main bodies 12a, 12b 12c, only the top wall 16 of the resin main body 12b located at a middle portion in the width direction of the vehicle (i.e., in the width direction of the structure 10 and in the transverse direction in FIG. 2) is bonded by welding, for instance, at its entire surface to a portion of the surface of the ceiling interior member 28 which contacts the top wall 16. Thus, the shock absorbing structure 10 is installed or mounted on the ceiling interior member 28 at its local area.

With the shock absorbing structure 10 being mounted on the ceiling interior member 28 as described above, the shock or impact generated by contact of the vehicle passenger with the ceiling interior member 28 is applied to the top wall 16 of the resin main body 12 through the ceiling interior member 28. Further, the leg walls 18 formed integrally with the top wall 16 extend toward one of opposite sides of the top wall 16 as seen in the thickness direction thereof, which one side is opposite to the other of the opposite sides on which the shock is applied, and the connecting-body-side corners 22 at the distal portions of the leg walls 18 are free ends which are opposed to the roof reinforcement 30 with a suitable spacing distance.

In the present embodiment, when a head portion 34 of the vehicle passenger is brought into contact, in the event of a collision from an accident, with the ceiling interior member 28 on which the present shock absorbing structure 10 is installed, the shock is applied via the ceiling interior member 28 to the top wall 16 of the resin main body 12b which is located at a position corresponding to a portion of the ceiling interior member 28 with which the head portion 34 of the vehicle passenger is brought into contact, as shown in FIG. 4, whereby the resin main body 12b is pressed toward the roof reinforcement 30. Then, the connecting-body-side-corners 22, 22 (as the free ends) at the distal portions of the respective two leg walls 18 of the resin main body 12b contact the roof reinforcement 30. With the displacement of the head portion 34 toward the roof reinforcement 30, the connecting-body-side corners 22 slide on the roof reinforcement 30 in directions away from each other with a suitable friction force.

Accordingly, the leg walls 18, 18 of the resin main body 12b are subjected to the opening deformation without being substantially subjected to the buckling deformation while the top-wall-side corners 20, 20 formed by the top wall 16 on which the shock is applied and the two leg walls 18 which extend from the top wall 16 are deformed such that the interior angle of each corner 20 is increased. The impact energy applied to the top wall 16 is absorbed based on the opening deformation of the leg walls 18 and the friction force caused between the connecting-body-side corners 22 at the distal portions of the leg walls 18 and the roof reinforcement 30.

Since the shock absorbing structure 10 is attached to the ceiling interior member 28 only at the top wall 16 of the resin main body 12b, the opening deformation of the leg walls 18 of the resin main body 12b is not restrained or inhibited by the ceiling interior member 28. As described above, the inner surface of each of the top-wall-side-corners 20 is given by the concave curved surface 24 having the radius of curvature $r_1$ of not less than 2 mm, so that the top-wall-side corners 20 do not suffer from the cracking or fracture. Since the inner surface of each of the connecting-body-side corners 22 is similarly formed, the connecting-body-side corners 22 do not suffer from the cracking or fracture. Accordingly, while the head portion 34 is displaced toward the roof reinforcement 30, the shock absorbing structure 10 continuously absorbs the impact energy with high stability based on the opening deformation of the leg walls 18.

The resin main bodies 12a, 12c located adjacent to the resin main body 12b which is located at the position corresponding to the portion of the ceiling interior member 28 with which the head portion 34 of the vehicle passenger is brought into contact are deformed in a manner generally similar to that of the resin main body 12b, though the amounts of deformation of the resin main bodies 12a, 12c are more or less different from the amount of deformation of the resin main body 12b. The impact energy generated by contact of the head portion 34 of the vehicle passenger with the ceiling interior member 28 is also absorbed by the deformation of the resin main bodies 12a, 12c.

With further displacement of the head portion 34 of the vehicle passenger toward the roof reinforcement 30, the resin main body 12b is deformed into a generally planar or flat shape in which the top wall 16 and the two leg walls 18, 18 are arranged substantially linearly, as shown in FIG. 5, while avoiding superposition of the top wall 16 and the leg walls 18 of the resin main body 12b on one another or superposition in each leg wall 18 of the resin main body 12b.

According to this arrangement, the effective stroke index is significantly increased in spite of the relatively small height of the resin main body 12b, so that the shock absorbing structure 10 is capable of sufficiently and efficiently absorbing the impact energy applied to the top wall 16.

In a state in which the shock absorbing structure 10 constructed as described above is disposed in the installation space 32 which has a considerably small size and which is defined by and between the ceiling interior member 28 and the roof reinforcement 30, the two leg walls 18 of the resin main body 12 are stably subjected to the opening deformation with significantly increased effective stroke index when the shock is applied to the top wall 16 of the resin main body 12 by contact of the head portion 34 of the vehicle passenger with the ceiling interior member 28. Accordingly, the impact energy generated by contact of the head portion 34 with the ceiling interior member 28 can be sufficiently and stably absorbed based on the opening deformation of the leg walls 18 of the resin main body 12. Thus, even if the installation space 32 in which the shock absorbing structure 10 is disposed is small or narrow, the structure 10 exhibits excellent shock absorbing capability.

In the present embodiment, the shock absorbing structure 10 is attached to the ceiling interior member 28 such that the top wall 16 of the resin main body 12*b* on which the shock is applied is bonded, at its entire surface contacting the ceiling interior member 28, to the same 28. The present arrangement does not suffer from a variation in the shock absorbing characteristics at different portions thereof depending upon whether the portions are fixed to the ceiling interior member 28 or not, as experienced in the conventional arrangement in which the top wall 16 is bonded at not its entire surface, but its local points to the ceiling interior member 28.

In the present embodiment, the top wall 16 of each resin main body 12 on which the shock is applied has the elongate rectangular shape, and the shock absorbing structure 10 is disposed between the ceiling interior member 28 and the roof reinforcement 30 such that the top wall 16 extends in the longitudinal direction of the vehicle. Accordingly, even when the point of contact between the ceiling interior member 28 and the vehicle passenger changes or moves in the longitudinal direction of the vehicle, the leg walls 18 can be subjected to the opening deformation with high stability, thereby effectively assuring safety of the passenger that is brought into contact with the ceiling interior member 28.

In the present shock absorbing structure 10, the plurality of resin main bodies (three resin main bodies in the present embodiment) which exhibit the shock absorbing capability are connected to one another by the plurality of connecting bodies 14 (two connecting bodies in the present embodiment). This arrangement permits easy installation of the structure 10 in the installation space between the ceiling interior member 28 and the roof reinforcement 30, as compared with an arrangement wherein a plurality of separate resin main bodies 12 which are mutually independent of each other are disposed between the ceiling interior member 28 and the roof reinforcement 30, for instance. Therefore, the present arrangement assures excellent shock absorbing capability with ease.

There will be next explained evaluation tests conducted for evaluating the shock absorbing characteristics of the shock absorbing structure according to the present invention and those of some shock absorbing structures having respective constructions different from the present structure.

Initially, there was produced, by using polypropylene, a shock absorbing structure as shown in FIG. 1 in which three resin main bodies are connected to one another by two planar connecting bodies. Each resin main body includes a rectangular top wall and two leg walls which extend integrally from opposite two end portions of the top wall so as to be opposed to each other, with the two leg wall being inclined such that a distance therebetween as measured in a first direction in which the two leg walls are opposed to each other gradually increases with an increase in a distance as measured in a second direction which is perpendicular to the first direction and which is away from the top wall toward distal portions of the two leg walls. This shock absorbing structure was used as a test product No. 1.

The propylene used for forming the test product No. 1 of the shock absorbing structure according to the present invention has tensile elongation (measured according to ASTM D638) of 300%. In the test product No. 1 produced as described above, the height of each resin main body is 15 mm, the thickness of each resin main body and each connecting body is 2 mm, and the interior angle of the top-wall-side corners formed by the top wall and the leg walls of each resin main body and the interior angle of the connecting-body-side corners formed by each connecting body and the mutually opposed two leg walls of adjacent two main resin bodies are 100°. Further, the inner surfaces of each top-wall-side corner and each connecting-body-side corner given by respective concave curved surfaces have a radius of curvature of 2.0 mm while the outer surfaces of each top-wall-side corner and each connecting-body-side corner given by respective convex curved surfaces have a radius of curvature of 0.5 mm.

In the meantime, there were prepared two shock absorbing structures as test products No. 2 and No. 3, respectively, which are identical in construction with the test product No. 1 described above, except that the radius of curvature of respective concave curved surfaces of each top-wall-side corner and each connecting-body-side corner is 1.5 mm in the test product No. 2 and the radius of curvature of respective concave curved surfaces of each top-wall-side corner and each connecting-body-side corner is 1.0 mm in the test product No. 3.

As a comparative example, there was prepared a conventional shock absorbing structure formed of a steel plate and disposed between a roof panel and a ceiling interior member of a vehicle. The conventional shock absorbing structure is substantially the same in construction with the test products Nos. 1–3 and has a thickness of 0.7 mm. This shock absorbing structure was used as a conventional product No. 1. The thickness of the conventional product No. 1 is 0.7 mm.

The thus prepared four shock absorbing structures (test products Nos. 1–3 and conventional product No. 1) were subjected to the following collision test in a known manner. Described more specifically, each product was fixed to a planar plate which was fixed to a table so as to be opposed to the same, such that the top wall of one of the three resin main bodies was bonded to one of opposite major surfaces of the plate which was opposed to the table. An impactor having a mass of 4.54 kg and assumed as a head portion of a vehicle passenger was collided at a rate of 6.7 m/s against the other of the opposite major surfaces of the plate which was opposite to the above-indicated one surface to which the top wall was bonded.

After the collision test conducted as described above, each of the four shock absorbing structures (test products Nos. 1–3 and conventional product No. 1) was visually inspected for its deformed state. It was confirmed that the leg walls of all of the four shock absorbing structures were subjected to the opening deformation. The visual inspection further revealed that the test product No. 2 suffered from a considerable degree of whitening at the top-wall-side corners and the connecting-body-side corners while the test product No. 3 suffered from cracking or fracture at those corners.

Figure 6:
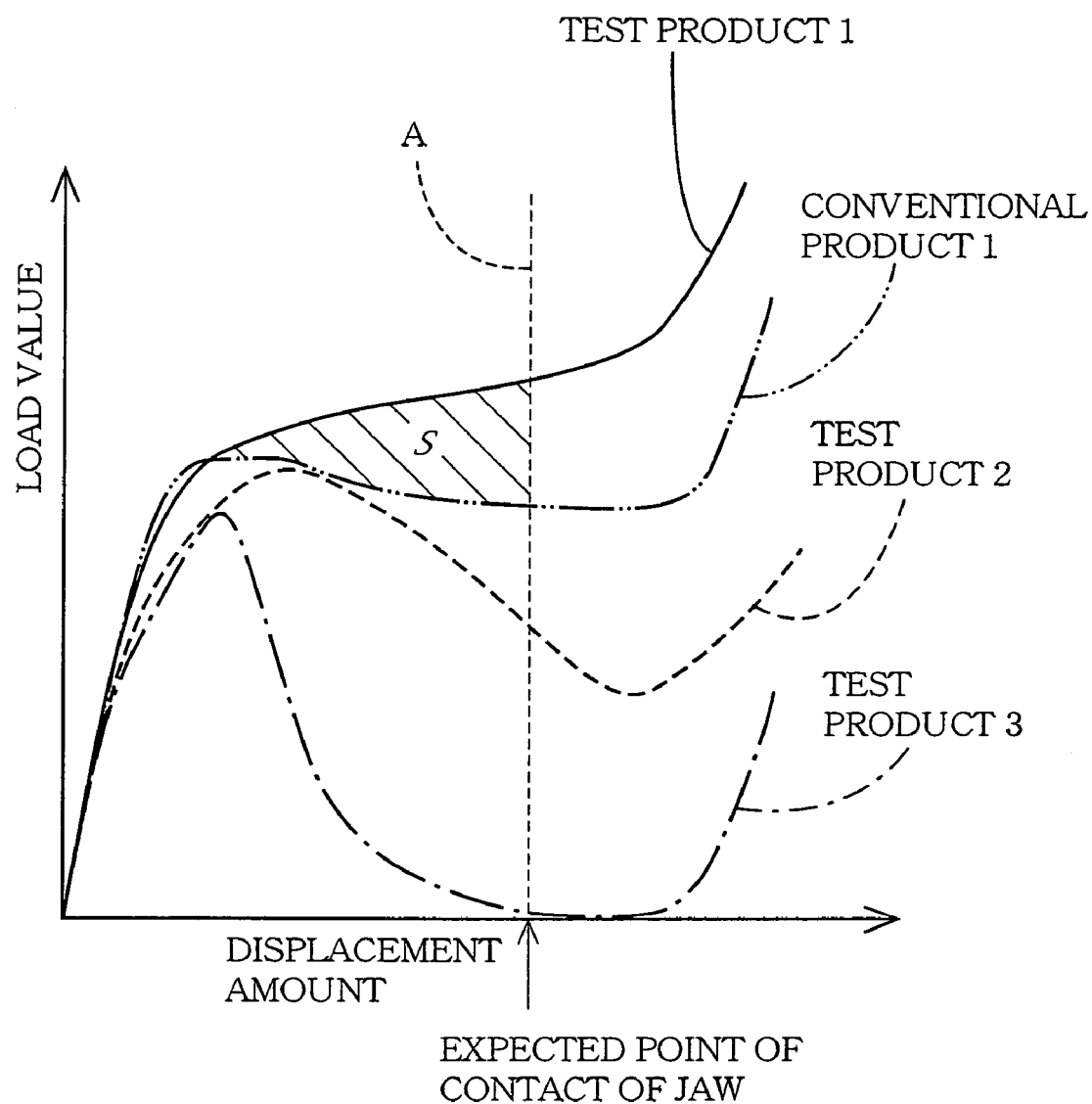
FIG. 6 is a graph indicating relationships between the load value and the displacement amount for the present shock absorbing structure, shock absorbing structures having respective constructions different from the present shock absorbing structure, and a conventional shock absorbing structure, respectively, the relationships being obtained by results of collision tests conducted on those shock absorbing structures.

After the collision test, there were obtained a load value of the shock on each of the test products Nos. 1–3 and the conventional product No. 1 and a displacement amount of each product by the shock, so as to obtain a relationship therebetween for each product, according to a known method. The relationships between the load value and the displacement amount obtained respectively for the test products Nos. 1–3 and the conventional product No. 1 are indicated in FIG. 6. As well known, when the head portion of the vehicle passenger is brought into contact with the vehicle component in the event of a collision from an accident, for instance, the jaw of the passenger is subsequently brought into contact with the vehicle component. In view of this, an expected point of contact of the jaw with the vehicle component at which the jaw of the passenger is expected to be brought into contact with the vehicle component after the collision of impactor assumed as the head portion is indicated by the broken line "A" in FIG. 6.

As is apparent from the respective load-displacement characteristics of the test product 1 of the shock absorbing structure according to the present invention and the conventional product 1 of the steel-plate-made shock absorbing structure shown in FIG. 6, the load value is larger in the test product 1 than in the conventional product 1 even where the displacement amounts of those products are the same. Accordingly, the amount of energy absorbed by the test product 1 before the jaw contacts the vehicle component is larger than that absorbed by the conventional product 1, by an amount corresponding to an area "S" defined and surrounded by the load-displacement curve of the test product 1 (indicated by the solid line in FIG. 6), the load-displacement curve of the conventional product 1 (indicated by the two-dot chain line in FIG. 6), and the broken line A indicating the amount of displacement at the point of contact of the jaw with the vehicle component. This clearly indicates that the shock absorbing structure according to the present invention exhibits more excellent shock absorbing capability than the conventional steel-plate-made shock absorbing structure.

As is apparent from the load-displacement characteristics of the test product 1 of the shock absorbing structure according to the present invention, and the test products 2 and 3 of the shock absorbing structures in each of which the radius of curvature of the concave curved surfaces of the top-wall-side corners and the connecting-body-side corners is outside the range specified according to the present invention, the amounts of impact energy absorbed by deformation of the test products 2 and 3 are smaller than the amount of impact energy absorbed by deformation of the test product 1 of the present invention. In each of the test products 2 and 3, though the load value increases with an increase in the displacement amount at an initial stage of the shock application, the load value reaches a peak value when the displacement amount becomes a certain value, and then the load value decreases with an increase in the displacement amount. This phenomenon seems to arise from the whitening and the fracture caused at the top-wall-side corners and the connecting-body-side corners of the shock absorbing structures according to the test products 2 and 3. Therefore, it is recognized that the shock absorbing structure exhibits excellent shock absorbing characteristics when the radius of curvature of the concave curved surfaces of the top-wall-side corners and the radius of curvature of the concave curved surfaces of the connecting-body-side corners are not less than 2.0 mm as specified according to the present invention.

While the presently preferred embodiment of the invention has been described in detail, for illustrative purpose only, it is to be understood that the present invention is not limited to the details of the illustrated embodiment, but may be otherwise embodied.

Figure 7:
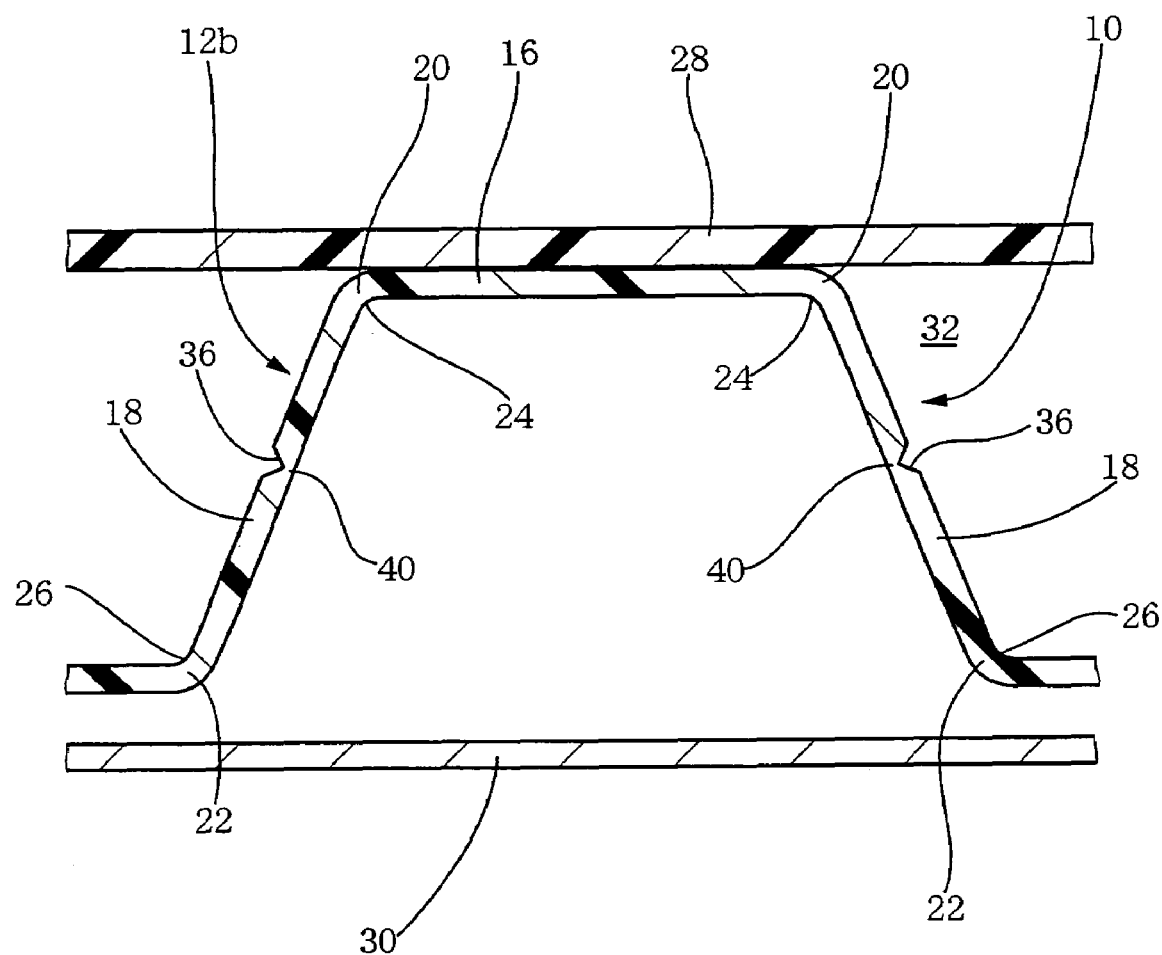
FIG. 7 is a view showing a shock absorbing structure constructed according to another embodiment, the view corresponding to FIG. 3.
Figure 8:
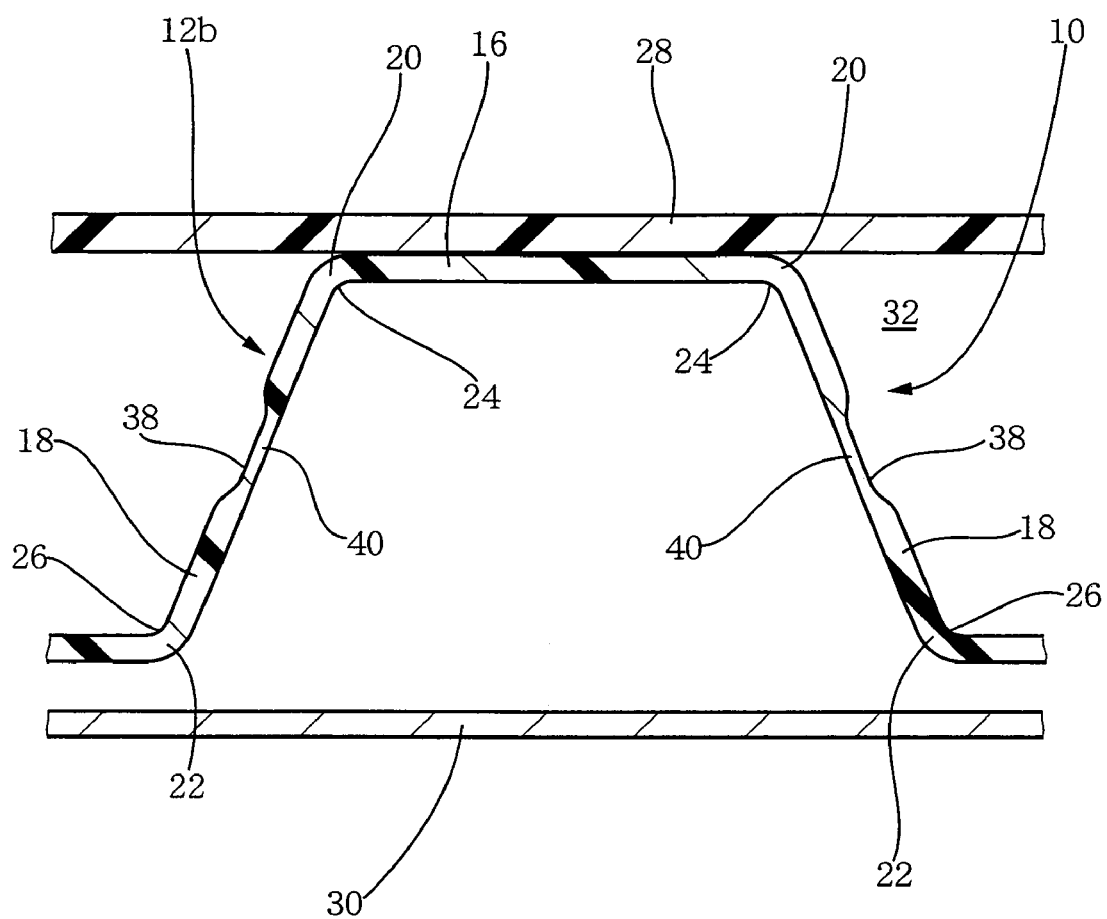
FIG. 8 is a view showing a shock absorbing structure constructed according to still another embodiment, the view corresponding to FIG. 3.

For instance, as shown in FIGS. 7 and 8, each of the leg walls 18, 18 of the resin main body 12 may be formed, at an intermediate portion thereof as seen in the direction of extension of the leg walls 18 from the top wall 16 (in the height direction), a groove 36 having a V-shape in cross section or a recess 38 which extends in a direction intersecting the direction of extension of the leg walls 18 (i.e., in a direction perpendicular to the plane of FIGS. 7 and 8). According to these arrangements, the thin-walled portion of each leg wall 18 which defines the bottom of the groove 36 or the recess 38 functions as a fragile portion 40 at which the leg wall 18 has a strength lower than the other portion thereof.

Where the leg walls 18 are formed with the fragile portions 40 formed as described above, the leg walls 18 are bent at the fragile portions 40 while the leg walls 18 are subjected to the opening deformation. Accordingly, the shock absorbing structure 10 whose leg walls 18 are provided with the fragile portions 40 exhibits appreciably different shock absorbing characteristics from those of the structure without the fragile portions 40. Described in detail, the shock absorbing structure whose leg walls 18 are formed with the fragile portions 40 exhibits a load-displacement curve represented by a generally rectangular waveform. Accordingly, the provision of the fragile portions 40 on the leg walls 18 makes it possible to easily tune the shock absorbing characteristics of the shock absorbing structure 10.

If the shock absorbing structure 10 is constituted by suitably combining the resin main body 12 with the fragile portions 40 and the resin main body 12 without the fragile portions 40, the shock absorbing structure 10 exhibits various shock absorbing characteristics. For instance, the shock absorbing structure 10 is disposed such that the resin main body 12 with the fragile portions 40 is located at a position in the installation space between the vehicle component and the vehicle body where the head portion of the vehicle passenger is brought into contact with the vehicle component with high possibility in the event of collision of the vehicle and such that the resin main body 12 without the fragile portions 40 is located at a position in the installation space where a part of the face such as the jaw of the passenger is brought into contact with the vehicle component with high possibility. The shock absorbing structure 10 disposed as described above advantageously exhibits the shock absorbing capability which assure improved safety of the vehicle passenger.

Each fragile portion 40 is not limited to the thin-walled portion which defines the bottom of the groove 36 having the V-shape in cross section or the recess 38 described above, but may be provided by otherwise formed thin-walled portion or other structure, as long as each leg wall 18 is easily bent at the fragile portion 40 by application of the shock. For instance, each leg wall 18 may be formed with a groove having a cross sectional shape other than the V-shape, and the thin-walled portion defining the bottom of the groove functions as the thin-walled fragile portion 40. The leg wall 18 may be formed with a plurality of through-holes formed through its thickness or a plurality of recesses each extending in the thickness direction of the leg wall 18 without penetrating therethrough. The through-holes or the recesses are provided so as to be spaced apart from each other at a suitable spacing distance in the direction intersecting the direction of extension of the leg wall 18 from the top wall 16. In such an arrangement, the thin-walled portion defining the bottom of each recess or a portion of the leg wall 18 interposed between adjacent ones of the through-holes functions as the fragile portion 40. Alternatively, there may be formed a hole within the leg wall 18 which extends in the direction intersecting the direction of extension of the leg wall 18 if it is possible to form such a hole. In this case, the leg wall 18 has a thin-walled portion at the hole formed as described above, and the thin-walled portion functions as the fragile portion 40. The number and position of the fragile portion 40 are not particularly limited. A plurality of fragile portions 40 may be provided on each leg wall 18 such that they are arranged in the direction intersecting the direction of extension of the leg wall 18 or the height direction of the leg wall 18.

Figure 9:
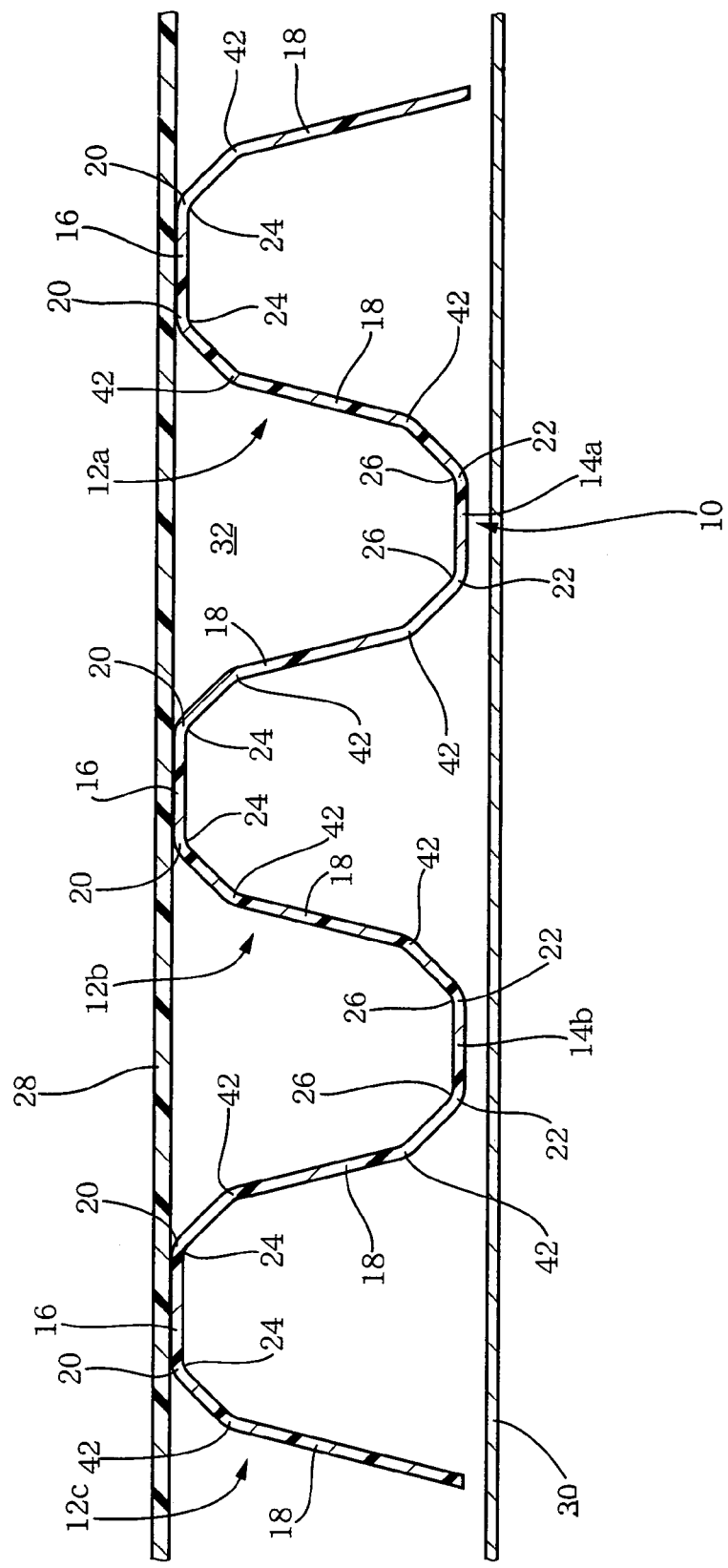
FIG. 9 is a view showing a shock absorbing structure constructed according to yet another embodiment, the view corresponding to FIG. 2.

FIG. 9 shows a modified embodiment of the shock absorbing structure 10 according to the present invention. In the structure 10 of FIG. 9, each leg wall 18 has bent portions 42 each of which has an interior angle of more than 90°, more preferably 140° to 165°, and which are respectively formed at its opposite ends located on the side of the top wall 16 and on the side of the connecting body 14, respectively. Thus, the leg wall 18 is constructed in a bent form. This arrangement permits the height of the resin main body 12 to be further reduced and the leg walls 18 to be easily subjected to the opening deformation upon application of the shock to the structure 10. In addition, this arrangement increases the number of the corners which are to be deformed, upon application of the shock, such that the interior angle of each corner is increased, resulting in easy tuning of the shock absorbing characteristics of the structure 10.

In the illustrated embodiment, the shock absorbing structure 10 is disposed in the installation space 32 between the ceiling interior member 28 and the roof reinforcement 30 such that the top wall 16 of only one resin main body 12*b* among the three resin main bodies 12*a*, 12*b* 12*c* is bonded to the ceiling interior member 28. The shock absorbing structure 10 may be otherwise disposed unless the deformation of the resin main bodies 12 are inhibited.

For instance, in a case where it is desirable to avoid vibration of the resin main bodies which are not fixed to the ceiling interior member or noise which may be generated by contact with other components, the shock absorbing structure 10 is formed to have a size which is sufficiently larger than an expected contact area of the ceiling interior member 28 within which the vehicle passenger is expected to be brought into contact with the same 28 in the event of collision, for instance, and the thus formed structure 10 may be bonded at its four corner portions to the ceiling interior member 28. The orientation or posture of the shock absorbing structure 10 in a state in which the structure 10 is disposed in the installation space 32 between the ceiling interior member 28 and the roof reinforcement 30 is not limited to that in the illustrated embodiment.

The number and the size of the resin main body 12 are not limited to those in the illustrated embodiment, but may be suitably determined depending upon the size of the installation space 32 in which the structure 10 is to be disposed, for instance.

The number and the size of the connecting body 14 which connects adjacent ones of the resin main bodies 12 may be changed depending upon the number and the size of the resin main body 12. For instance, where the shock absorbing structure 10 is constituted by only one resin main body 12, the connecting body 14 is eliminated.

In the illustrated embodiment, the size of the interior angle $\theta_1$ of the top-side-corner 20 is equal to the size of the interior angle $\theta_2$ of the connecting-body-side corner 22. The sizes of the interior angles corners $\theta_1$, $\theta_2$ may be different from each other. In the illustrated embodiment, the radius of curvature $r_1$ of the concave curved surface which gives the inner surface of each top-wall-side corner 20 is equal to the radius of curvature of the concave curved surface 26 which gives the inner surface of each connecting-body-side corner 22. The radius of curvature $r_1$ may be different from the radius of curvature $r_2$.

While there have been described the shock absorbing structure disposed between the ceiling interior member and the roof reinforcement of the motor vehicle and the shock absorbing assembly for the vehicle comprising the shock absorbing assembly as the preferred embodiment of the present invention, the principle of this invention is equally applicable to a shock absorbing structure disposed between a component of any vehicle other than the motor vehicle and a body of the vehicle, and a shock absorbing assembly comprising such a shock absorbing structure.

It is to be understood that the present invention may be embodied with various other changes, modifications and improvements, such as those described in the SUMMARY OF THE INVENTION, which may occur to those skilled in the art, without departing from the spirit and scope of the invention defined in the following claims.

What is claimed is:

1. A shock absorbing structure for a vehicle comprising at least one resin main body which includes a planar top wall to which a shock is to be applied and two planar leg walls which are formed integrally with said top wall such that said two leg walls respectively extend from opposite two end portions of said top wall so as to be opposed to each other, toward one of opposite sides of said top wall, which side is opposite to the other side thereof on which the shock is applied, said at least one resin main body being formed of a synthetic resin material, wherein said two leg walls are provided on said top wall so as to be inclined such that a distance between said two leg walls in a first direction in which said two leg walls are opposed to each other gradually increases with an increase in a distance in a second direction which is perpendicular to said first direction and which is away from said top wall toward distal portions of said two leg walls, with an obtuse interior angle being formed at each of corners which are formed by said top wall and the respective two leg walls, said top wall and said two leg walls being formed integrally with each other by using a synthetic resin material whose tensile elongation according to ASTM D638 is not less than 150%, an inner surface of said each of said corners being provided by a concave curved surface having a radius of curvature of not less than 2.0 mm, each of said leg walls having a longitudinal axis, and the axes of said walls extend parallel to one another, and wherein a deformation mode of each of said top walls and said respective two leg walls is a spreading of said leg walls apart from one another increasing both of said obtuse interior angles, each formed between one of said respective leg walls and said top wall.

2. A shock absorbing structure according to claim 1, wherein said at least one resin main body consists of a plurality of resin main bodies which are arranged such that adjacent ones of said plurality of resin main bodies are spaced apart from each other by a predetermined spacing distance therebetween with one of said two leg walls of one of the adjacent two resin main bodies and one of said two leg walls of the other of the adjacent two resin main bodies being mutually opposed to each other, said shock absorbing structure further comprising at least one planar connecting body which is formed of a synthetic resin material and which is disposed between the adjacent two resin main bodies such that a direction of thickness of said at least one connecting body corresponds to a direction of height of said two leg walls, so that said one of said two leg walls of said one of the adjacent two resin main bodies and said one of said two leg walls of the other of the adjacent two resin main bodies are connected to each other at the respective distal portions thereof remote from the respective top walls of said adjacent two resin main bodies.

3. A shock absorbing structure according to claim 2, wherein said at least one connecting body is formed integrally with said resin main bodies by using said synthetic resin material used for forming said resin main bodies, an inner surface of each of corners which are formed by said at least one connecting body and the mutually opposed leg walls of the adjacent two resin main bodies being provided by a concave curved surface having a radius of curvature of not less than 2.0 mm.

4. A shock absorbing structure according to claim 1, wherein said top wall of said at least one resin main body is an elongate plate having a prescribed length, and said two leg walls provided on said top wall respectively extend in a longitudinal direction of said top wall and are opposed to each other in a direction perpendicular to said longitudinal direction.

5. A shock absorbing structure according to claim 1, wherein each of said two leg walls is formed with at least one fragile portion at which said each of said two leg walls has a strength lower than the other portion thereof, said at least one fragile portion extending in a direction which intersects a direction of extension of said two leg walls from said top wall, said two leg walls being bent at said at least one fragile portion when the shock is applied to the top wall.

6. A shock absorbing structure according to claim 1, wherein said obtuse interior angle at said each of said corners which are formed by said top wall and the respective two leg walls of said at least one resin main body is more than 95 degrees.

7. A shock absorbing structure according to claim 3, wherein each of said corners which are formed by said at least one connecting body and the mutually opposed leg walls of the adjacent two resin main bodies has an obtuse interior angle of more than 95 degrees.

8. A shock absorbing structure according to claim 1, wherein said synthetic resin material whose tensile elongation according to ASTM D638 is not less than 150% is selected from the group consisting of: olefin resin; a mixture of olefin resin and organic filler; a mixture of olefin resin and glass fiber; and ABS resin.

9. A shock absorbing structure according to claim 5, wherein said at least one fragile portion is provided by a thin-walled portion of each of said leg walls defined by the bottom of a groove or a recess which extends in a direction intersecting the direction of extension of each of said leg walls.

10. A shock absorbing structure according to claim 1, wherein each of said leg walls has at least one bent portion each of which has an obtuse interior angle of more than 90 degrees.

11. A shock absorbing assembly for a vehicle, comprising the shock absorbing structure defined in claim 1, a component of the vehicle, and a body of the vehicle, wherein said shock absorbing structure is installed on said component so as to be disposed in a space between said component and said body of the vehicle, such that one surface of said top wall of any one of said at least one resin main body, which surface is located on the other of the opposite sides thereof on which the shock is applied, is fixed to one surface of said component which is located on one of opposite sides thereof nearer to said body of the vehicle, with said distal portions of the respective two leg walls remote from said top wall not being fixed to said body of the vehicle.

12. A shock absorbing structure according to claim 9, wherein one of said groove and said recess is provided on an outer surface of each of said leg walls.

13. A shock absorbing structure according to claim 1, wherein a cross section taken along a longitudinal axis of said leg walls has a generally rectangular shape.

14. A shock absorbing structure according to claim 1, wherein the entirety of the shock absorbing structure is formed of the resin material having a tensile elongation of not less than 150%.

* * * * *